Oct. 28, 1924.　　　　　　　　　　　　　　　1,513,457
C. A. JACKSON
VALVE OPERATING APPARATUS
Filed Feb. 12, 1920　　　　　2 Sheets-Sheet 1

Inventor
Charles Arthur Jackson
By his Attorney

Oct. 28, 1924.

C. A. JACKSON 1,513,457

VALVE OPERATING APPARATUS

Filed Feb. 12, 1920

Inventor
Charles Arthur Jackson
By his Attorney

Patented Oct. 28, 1924.

1,513,457

UNITED STATES PATENT OFFICE.

CHARLES ARTHUR JACKSON, OF RIDGEWOOD, NEW JERSEY.

VALVE-OPERATING APPARATUS.

Application filed February 12, 1920. Serial No. 358,070.

*To all whom it may concern:*

Be it known that I, CHARLES A. JACKSON, a citizen of the United States of America, residing at Ridgewood, county of Bergen, State of New Jersey, have invented certain new and useful Improvements in Valve-Operating Apparatus, of which the following is a specification.

My invention relates to mechanism for operating valves and is particularly adapted to the remote control of four-way valves controlling the hydraulic apparatus used to open and close the supply valve for isolated turbine plants, and to similar purposes.

Many large country places have small hydro-electric plants located at points remote from the houses and other buildings, which plants are used to generate current applied to the lighting of house and buildings, and which plants are operated intermittently. The main valve or gate controlling the flow of water to the turbine is usually hydraulically operated, and a small motor is employed to operate a four-way plug valve or other valve which admits the water to either end of an hydraulic cylinder which contains the piston which is forced up or down to open and close the big valve or gate which controls the flow of water to the turbine valve or gate. This motor is operated by a battery and controlled by a switch at the distant house and it becomes important to conserve the battery so that it need not often require recharging or replacement. My invention accomplishes this purpose and has certain other advantages hereinafter made apparent. The best form of apparatus embodying my invention, at present known to me, is illustrated in the accompanying two sheets of drawings in which—

Figure 2:
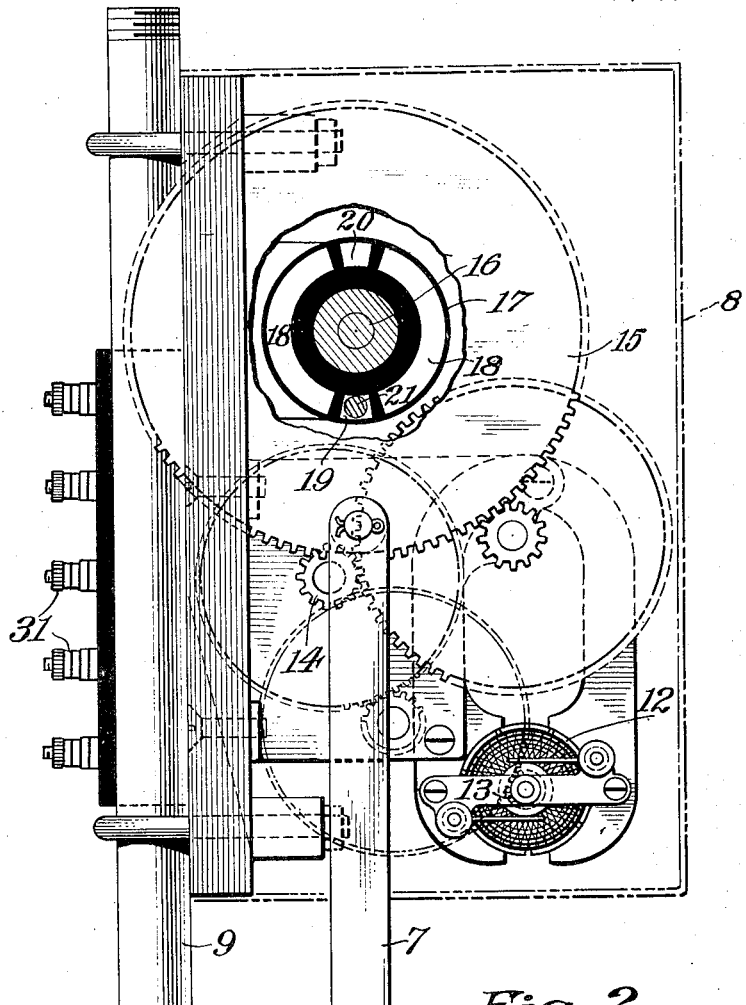
Fig. 2 is an enlarged side view of the four-way valve for controlling the hydraulic apparatus and an electrically driven mechanism for operating the valve, parts being shown in diagram.

Throughout the drawings like reference characters indicate like parts. 1 is the gate or large valve controlling the supply of water to a turbine, not shown. This gate is raised and lowered by the water pressure admitted from the main or from gate housing 3, through pipes 4 and 10 or 4 and 9, to either end of the cylinder 2. Admission to pipes 9, and 10, is controlled by valve 5, having a lever 6, on its spindle to which connecting rod 7, is adjustably pivoted. The other end of rod 7, is moved up or down by a moter mechanism in casing 8. The water is discharged from the cylinder 2, through pipes 9, 11, or 10, 11, when the piston is forced toward the end of the cylinder, so connected to exhaust pipe 11.

Figure 5:
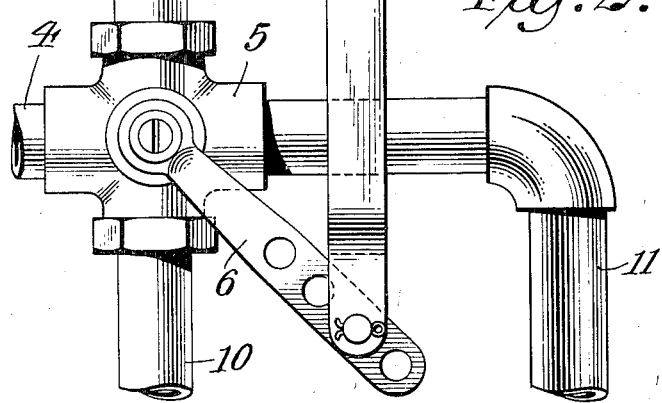
Fig. 5 is a detail section of the four-way valve, showing the ports and passages therein.
Figure 5:
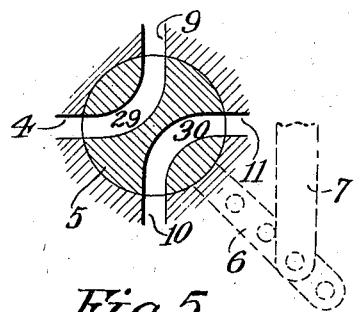

When the valve 5 is of the four-way construction illustrated in Fig. 5, the pressure water enters the upper end of cylinder 2, to close the gate down when the valve plug, passage 29, communicates with pipes 4 and 9, as shown in the drawing, and the water left in the lower end of the cylinder from a previous operation then escapes through valve passage 30, which connects pipes 10 and 11. When the valve is turned about 90 degrees so that passage 29, connects pipes 4, and 10, and passage 30, connects pipes 9, and 11, the gate 1, is lifted and the connected turbine set into operation.

Figure 4:
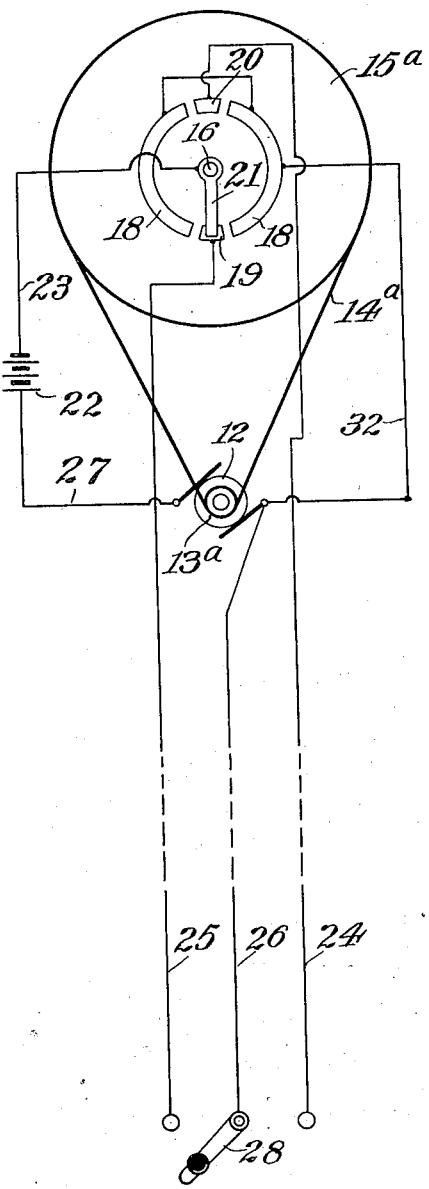
Fig. 4 is a diagram of the electrical circuits.

Motion of valve lever 6, needed to operate valve 5, is, in the particular embodiment of the invention here shown, obtained by successive semi-revolutions of the crank disc 15, to which the upper end of connecting rod 7, is pivoted. 12 is a small, high speed electric motor which can be driven by the current from a small battery 22 of dry cells connected up with it in a short local circuit as shown in diagram in Fig. 4. A pinion 13, on the motor shaft drives a high-ratio reducing gearing 14, which transmits motion to crank disc 15 equipped with gear teeth on its circumference. The crank shaft bearing carries an insulating disc 17, on the face of which curved sectors 18, 19, and 20, of conducting material are mounted so as to be concentric with shaft 16. A spring pressed plunger 21 on crank disc 15, rides over these sectors progressively and by cooperation therewith forms a circuit controller. Binding posts 31, serve for wiring connections from motor brushes and circuit controller posts to the external battery 22, and remote switch 28.

Figure 1:
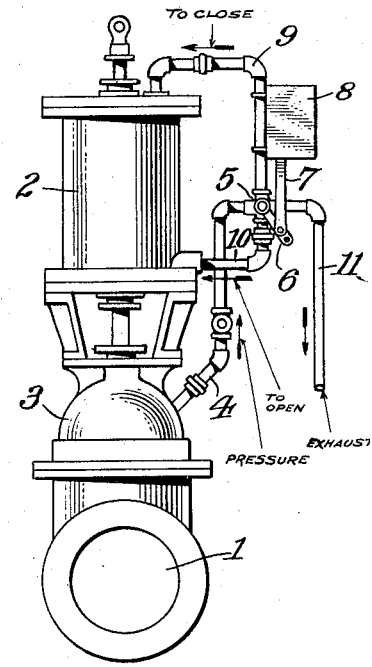
Fig. 1 is an elevation of the usual hydraulic apparatus for opening and closing the gate in the supply main, with my invention attached.
Figure 3:
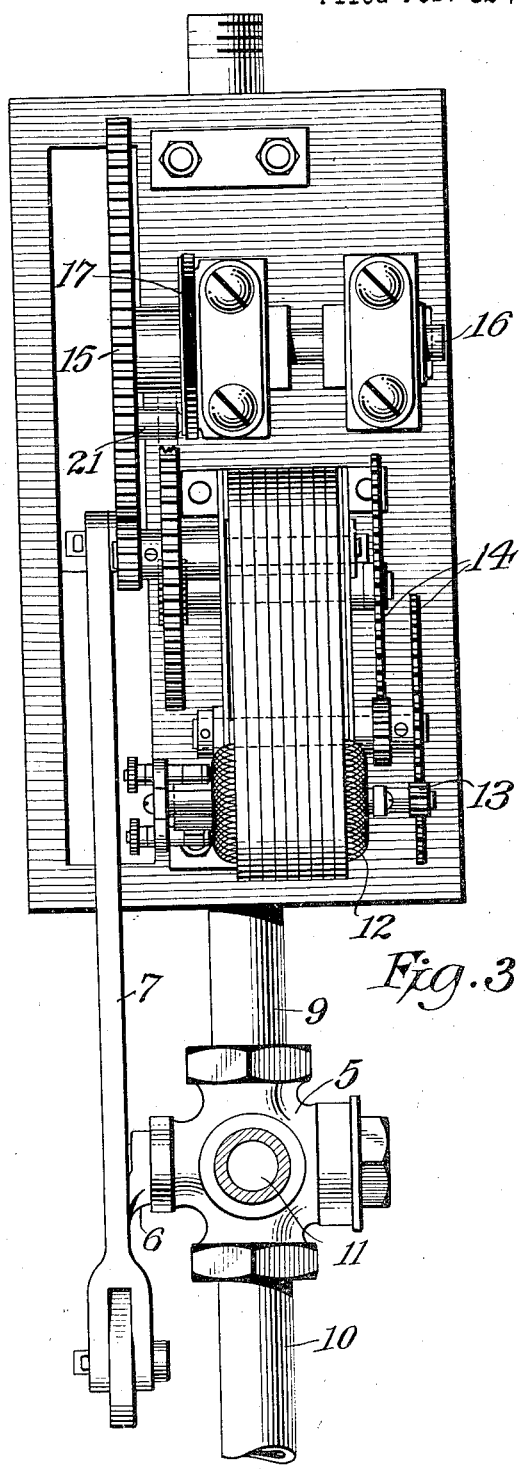
Fig. 3 is an end view of the same, parts being broken away.

The circuits are shown in diagram, Fig. 4, where for simplicity the belt gearing 13ª, 14ª, 15ª is substituted for the toothed gearing 13, 14, 15, preferably used and shown in Figs. 1 and 3.

With the apparatus here shown a two pole switch 28 is employed which is connected by wire 26, to the local circuit 23, 27, 32 (which includes battery, motor and circuit controller) at one pole of motor 12. Portion 32 of this circuit lies between the same pole of the motor and the circuit controller, connecting with sectors 18, 18 of the latter. The traveling contact 21, on crank disc 15, is connected to one pole of battery 22, by wire 23. Wire 27 connects the other pole of the battery with the commutator brush of the motor 12, to which switch 28 is not connected, and the wire 32 extends from the other pole of the motor to the contact sectors 18, 18 which are oppositely disposed one to the other in the circular path of circuit controller member 21, and electrically connected together. Consequently so long as plunger 21, rests on one of the sectors 18, 18, the motor circuit is complete through the local circuit and the motor will slowly rotate crank disc 15, or other revoluble member geared to it, and member 21, over disc 17. Between the adjacent ends of sectors 18, 18, are located short sectors 19 and 20 of conductive material which are electrically insulated from sectors 18, 18, and from each other. Consequently when travelling controller member 21 is driven off of one of the sectors 18, onto one of the short sectors 19 or 20, the local motor and battery circuit is broken. Sector 19, is connected by wire 25, to one pole of switch 28, and wire 24, connects the other pole of said switch with the other sector 20. The motor circuit can therefore be closed when the circuit controller element 21, rests on one of the sectors 19, or 20, by closing switch 28, on the corresponding pole. This will again start the motor and circuit controller into action and when element 21, runs off the short sector on to a long sector 18, the local circuit 23, 32, 27 is reestablished, and the long shunt switch circuit cut out. Consequently motor 12 continues to rotate until plunger 21, runs off the long sector onto the other short sector.

Normally the circuit controlling apparatus and revoluble member 15 is at rest, the gate 1, being open or closed. To change the position of the gate the operator at the control station moves switch 28, on to the pole marked "Open," or onto that marked "Close," as occasion may arise, and thereupon the circuit will be established through the corresponding short sector 19 or 20, on which the circuit controller traveling contact 21, is then resting, and the motor 12, will be rotated until 21, has traveled over the corresponding long sector, when the motor circuit will be opened, but the momentum of the armature and gearing will carry 21, along until it reaches a position well over the next short sector, as shown in Figs. 1 and 4. If the operation described has opened gate 1, and set the turbine into rotation, the same may be shut down again by reversing switch 28, which will turn valve 5, into the position shown in Fig. 2, which will close gate 1. If, however, the switch 28, is turned the wrong way, nothing happens.

If the pressure in supply pipe 4 is so high that gate 1, is moved too rapidly, valve 5, may be adjusted to give only partial port openings by shifting the connection of link 7, to one of the holes nearer the end of valve lever 6, as this will reduce the angle of movement of said valve lever, the distance traveled by link or connecting rod 7 being uniform. This will cause the valve ports to be only partially opened and the velocity of the flow of water into cylinder 2, correspondingly reduced. On the other hand if the existing adjustment of valve connections moves the gate more slowly than is necessary, its operation may be speeded up by moving the link connection to a hole nearer the axis of valve 5, thereby giving the valve ports more complete opening. The limit of adjustment in this direction should be one which will give valve 5, full port openings, as shown in Fig. 5.

One advantage of the invention arises from the fact that during initial movement of the valve, when the resistance due to any sticking of the valve plug occurs, the crank disc 15, is moving from near a dead center and exerts the greatest force on lever 6, with the least expenditure of torque force by the motor. The light load then placed on the motor is also advantageous as it reduces any tendency to arcing when contact 21, is crossing from one sector of the circuit controller to another. This arcing tendency is also counteracted by making the face of finger 21, broad enough to lap over onto the next sector before it leaves the one on which it is traveling. The rapid angular movement of finger 21, when crossing the gaps between sectors, due to the light load on the motor at those times permitting it to speed up, also tends to reduce arcing.

Other forms of motor might be substituted for the electric motor shown, and the first of the above noted advantages retained so long as the crank and connecting rod operating the valve always start from near a dead center.

A practical advantage also results from the fact that my invention permits the motor, gearing and circuit controller to be made in one small, light unit which may be clamped to one of the pipes, as shown, and the same may be readily removed for cleaning or repairs.

Various changes in details and arrangements of parts illustrated, obvious to those skilled in the art, could be made without departing from the substance of my invention, so long as the principles of operation above explained are retained.

Having described my invention, I claim:

1. A mechanism for producing intermittent semi-revolutions adapted for operating a valve or the like, which mechanism comprises in combination a rotary crank, an electric motor geared to said crank, a source of supply of electric current, one pole of which is connected to one pole of the motor, a contact member carried by the crank to which contact member the other pole of the source of current supply is connected, a series of four contact members over which the crank contact moves when the crank rotates, two of said sectors oppositely opposed one to another being connected to the other pole of the motor, a two-poled switch, a connection from each pole of the switch to one of the other sectors and a connection from the switch to the last mentioned motor pole.

2. The combination, with an hydraulic cylinder having connections at either end for fluid under pressure, a reciprocating valve controlling said connections, and inlet and exhaust connections to said valve, of an operating crank on the valve spindle, a driving element provided with a rotating crank shorter than that on the valve spindle, and a connecting rod pivoted to said cranks, one of said pivotal connections being adjustable radially of the crank whereby through changes in said pivotal connections the extent and speed of opening and the speed of closing of the valve ports may be varied without varying the movement of the driving element.

3. In an apparatus of the character described the combination of an electric motor, a crank and connecting rod, reducing gearing connecting the motor and crank, a circuit controller comprising a series of mutually insulated contact sectors and a cooperating contact finger, one of said cooperating members being stationary and the other moving with the crank, and two parallel motor operating circuits connected to the circuit controller, all circuit breaks between said sectors being located at points traversed by the cooperating finger while the crank is near a dead center, whereby a light load only is placed on the motor during periods of circuit changing and any tendency to arcing between opening or closing contacts is thereby reduced.

CHARLES ARTHUR JACKSON.